(12) United States Patent
Henn et al.

(10) Patent No.: US 12,553,210 B2
(45) Date of Patent: Feb. 17, 2026

(54) SKID STEER LOADER POWER BOOST

(71) Applicant: Deere & Company, Moline, IL (US)

(72) Inventors: Grant R. Henn, Dubuque, IA (US);
Michael R. Elgin, Dubuque, IA (US);
Brett S. Graham, Dubuque, IA (US);
Karl G. Heine, Dubuque, IA (US);
Jason Bennett, Dubuque, IA (US)

(73) Assignee: Deere & Company, Moline, IL (US)

( * ) Notice: Subject to any disclaimer, the term of this patent is extended or adjusted under 35 U.S.C. 154(b) by 508 days.

(21) Appl. No.: 18/170,081

(22) Filed: Feb. 16, 2023

(65) Prior Publication Data

US 2024/0279901 A1 Aug. 22, 2024

(51) Int. Cl.
*E02F 3/43* (2006.01)
*E02F 3/34* (2006.01)

(52) U.S. Cl.
CPC ............ *E02F 3/431* (2013.01); *E02F 3/3414* (2013.01)

(58) Field of Classification Search
CPC ....... E02F 3/431; E02F 3/3414; E02F 3/3405; E02F 9/2228
USPC .............................................. 700/275; 701/5
See application file for complete search history.

(56) References Cited

U.S. PATENT DOCUMENTS

| | | | |
|---|---|---|---|
| 10,648,154 B2 | 5/2020 | Henn et al. | |
| 2018/0202468 A1* | 7/2018 | Tracy | F15B 11/10 |
| 2018/0373275 A1* | 12/2018 | Beschorner | G01S 17/86 |
| 2020/0399105 A1* | 12/2020 | Draayer | B66F 17/003 |
| 2021/0230829 A1 | 7/2021 | Okada et al. | |
| 2023/0044138 A1* | 2/2023 | Neier | A01K 5/0283 |
| 2023/0062437 A1* | 3/2023 | Koyama | B66F 9/22 |

FOREIGN PATENT DOCUMENTS

EP 1691084 A2 8/2006

OTHER PUBLICATIONS

German Search Report issued in application No. 102023134717.9 dated Jul. 18, 2024, 10 pages.

* cited by examiner

*Primary Examiner* — Thomas C Lee
*Assistant Examiner* — Michael V Farina
(74) *Attorney, Agent, or Firm* — Lucian Wayne Beavers; Patterson Intellectual Property Law, PC

(57) ABSTRACT

A construction machine includes a machine frame, a plurality of ground engaging wheels or tracks supporting the machine frame, a work implement, and a lifting linkage connected to the work implement for lifting and lowering the work implement relative to the machine frame. A position sensor is operably associated with the lifting linkage for generating a position signal representative of a position of the lifting linkage within a range of motion. A hydraulic actuator is connected to the lifting linkage for moving the lifting linkage through the range of motion. A hydraulic pressure supply system provides hydraulic pressure to the hydraulic actuator. A controller is configured to receive the position signal and to generate a control signal to vary a system relief pressure of the hydraulic pressure supply system at least in part in response to the position signal.

14 Claims, 9 Drawing Sheets

SKID STEER LOADER POWER BOOST

BACKGROUND OF THE DISCLOSURE

Field of the Disclosure

The present disclosure relates to a construction machine such as a skid steer loader, a crawler loader, a backhoe loader or a four-wheel drive loader.

Description of the Prior Art

One issue which is important to the design and operation of such loader machines is the stability of the machine when lifting heavy loads. Loader type construction machines are typically rated for operating capacity at a specified percentage of "Tipping Load." The "Tipping Load" is the load carried by working implement of the machine which will cause the machine to tip forward. This tipping load is a function of the position of a lifting linkage of the machine within its range of motion because the load carried by the working implement has a varying horizontal distance from a center of gravity of the machine depending on the position of the lifting linkage within its range of motion.

The prior art solution to avoid unsafe operation of the machine is to provide a static, i.e. fixed relief pressure, pressure relief valve in the hydraulic pressure supply to the lifting actuators, so that the machine is not allowed to lift a load in excess of its tipping load.

SUMMARY OF THE DISCLOSURE

In one embodiment a construction machine includes a machine frame, a plurality of ground engaging wheels or tracks supporting the machine frame, a work implement, and a lifting linkage connected to the work implement for lifting and lowering the work implement relative to the machine frame. The lifting linkage is moveable through a range of motion from a lowermost position to an uppermost position. A position sensor is operably associated with the lifting linkage for generating a position signal representative of a position of the lifting linkage within the range of motion. A hydraulic actuator is connected to the lifting linkage for moving the lifting linkage through the range of motion. A hydraulic pressure supply system provides hydraulic pressure to the hydraulic actuator. A controller is configured to receive the position signal and to generate a control signal to vary a system relief pressure of the hydraulic pressure supply system at least in part in response to the position signal.

In another embodiment a method is provided for operating a construction machine, the construction machine including a machine frame, a plurality of ground engaging wheels or tracks supporting the machine frame, a work implement, a lifting linkage connected to the work implement and movable through a range of motion from a lowermost position to an uppermost position, a hydraulic actuator for moving the lifting linkage, and a hydraulic pressure supply system for providing hydraulic pressure to the hydraulic actuator. The method comprises steps of:
 sensing a position of the lifting linkage within the range of motion and generating a position signal corresponding to the sensed position; and
 receiving the position signal with a controller and generating a control signal to vary a system relief pressure of the hydraulic pressure supply system at least in part in response to the position signal.

Numerous objects, features and advantages of the present invention will be readily apparent to those skilled in the art upon a review of following description in conjunction with the accompanying drawings.

DETAILED DESCRIPTION

Figure 1A:
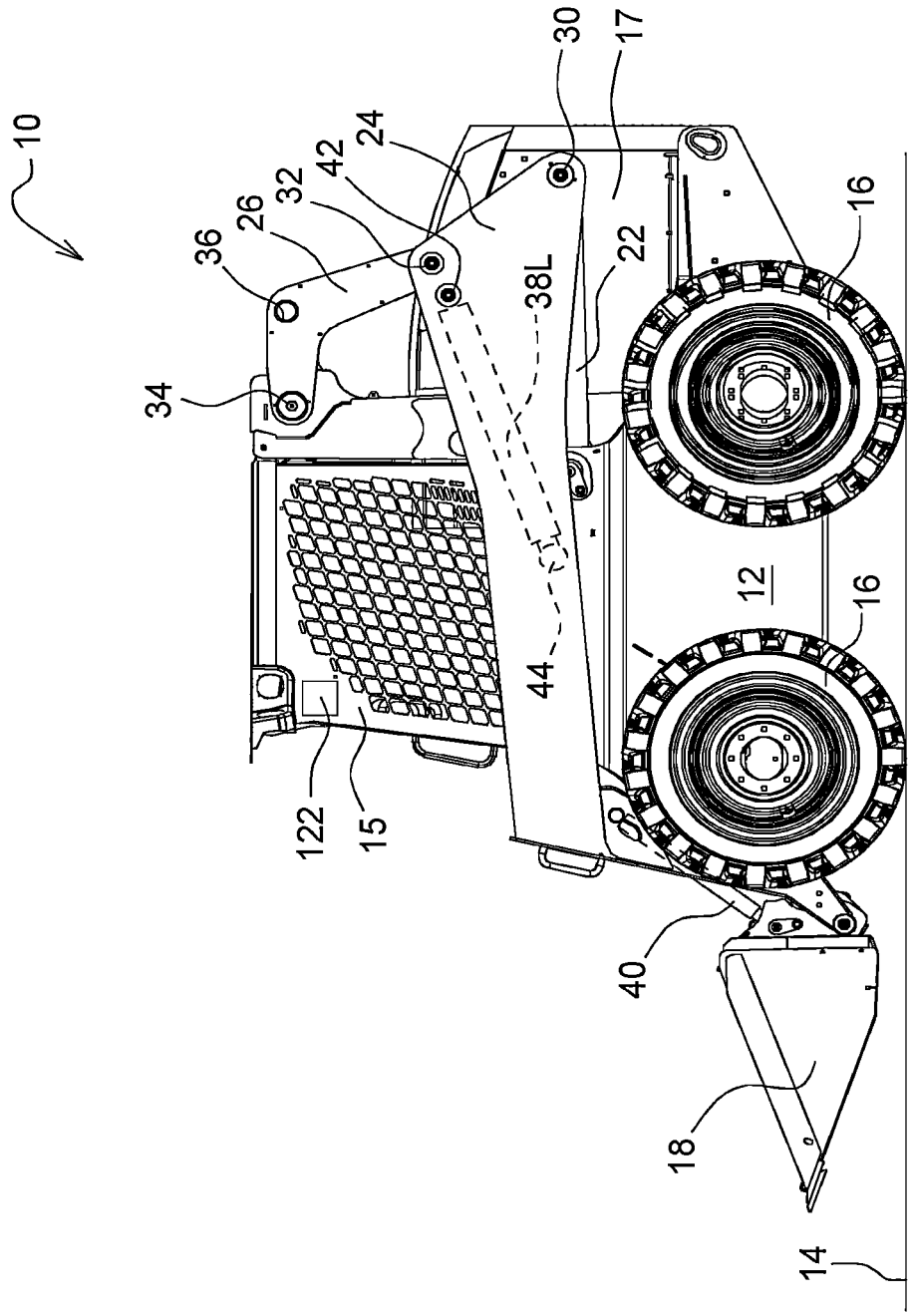
FIG. 1A is a side elevation view of a construction machine in the form of a skid steer loader with the lifting linkage in a lowermost position.
Figure 1B:
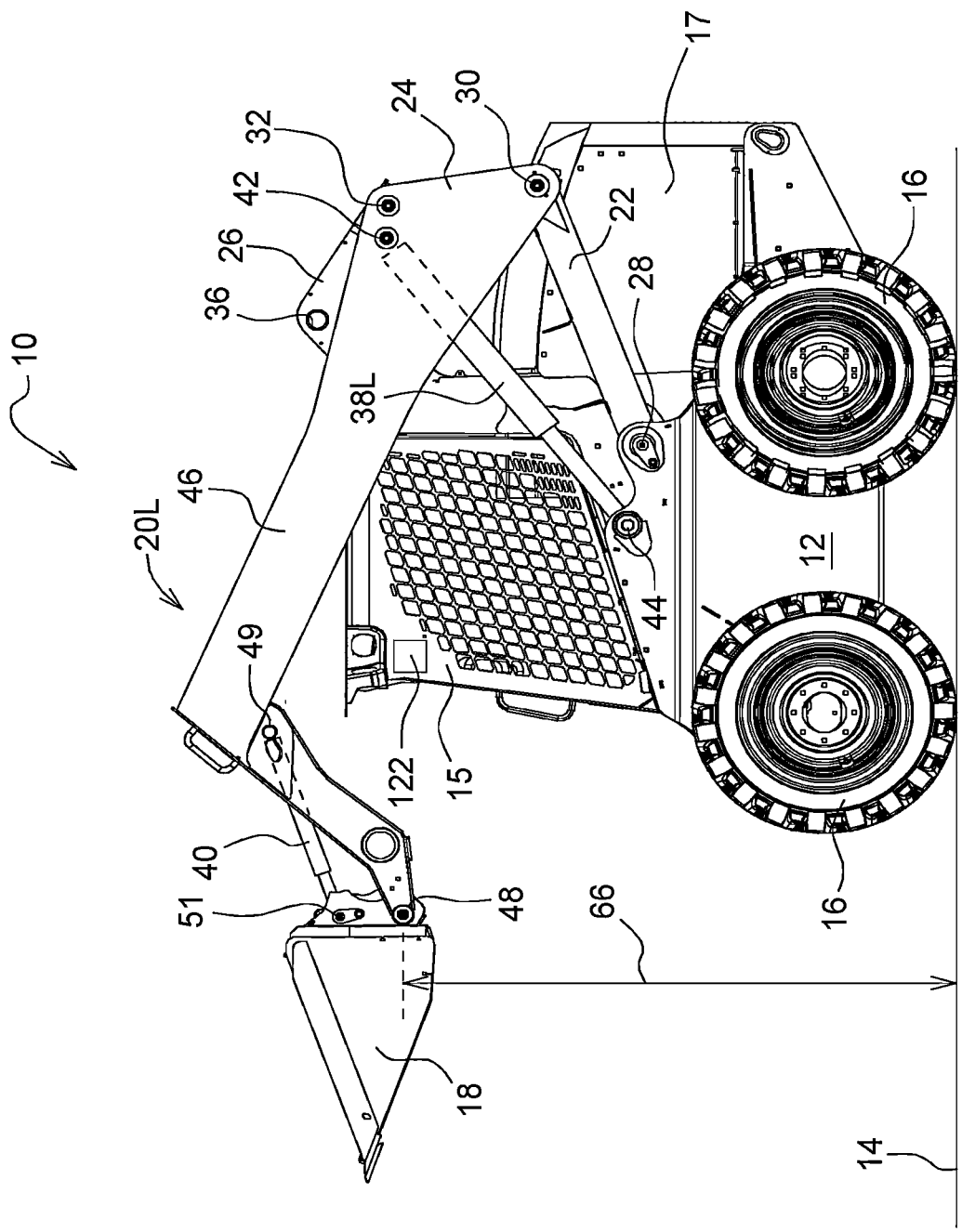
FIG. 1B is a side elevation view of the construction machine of FIG. 1A with the lifting linkage in an intermediate position.
Figure 1C:
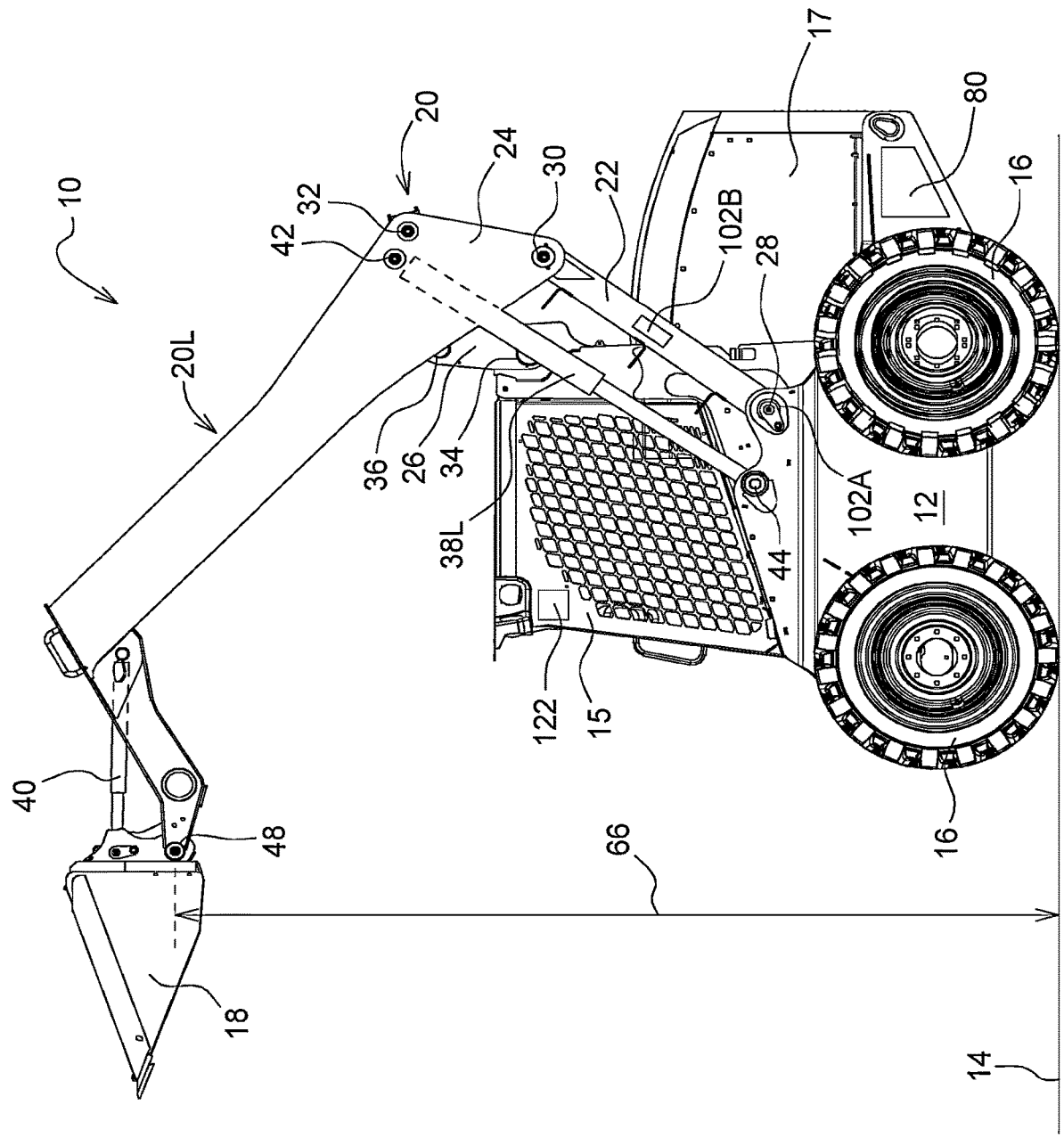
FIG. 1C is a side elevation view of the construction machine of FIGS. 1A and 1B with the lifting linkage in an uppermost position.

Referring now to the drawings and particularly to FIGS. 1A-1C a construction machine in the form of a skid steer loader is shown and generally designated by the number 10. The construction machine may also take the form of other types of loader machines such as a crawler loader, a backhoe loader or a four-wheel drive loader. The construction machine 10 includes a machine frame 12 which is supported from a ground surface 14 by a plurality of ground engaging wheels or tracks 16. The skid steer loader 10 is shown as have two front and two rear wheels 16. Other embodiments of the construction machine 10 may have two tracks such as in the form of a tracked compact loader. An operator's station 15 is located on the machine frame 12. A prime mover 17, such as an internal combustion engine or an electric motor, is located on the machine frame 12 for powering the machine 10. The prime mover 17 may drive the hydraulic pump 52 described below and may power the other components of the machine 10.

The machine 10 includes a work implement 18, shown in the form of a bucket 18. A lifting linkage generally designated as 20 is connected between the machine frame 12 and the work implement 18 for lifting and lowering the work implement 18 relative to the machine frame 12. The bucket 18 may be replaced with other types of work implements.

The lifting linkage 20 is a kinematic linkage including a plurality of links connected together at a plurality of pivotal joints. In the illustrated embodiment the lifting linkage includes a first link 22, and second link 24 and a third link 26. A portion of the machine frame 12 may be considered to form a fourth link of the lifting linkage 20 as further explained below.

The first link 22 is pivotally connected to the machine frame at a first pivotal joint 28. The first and second links 22 and 24 are pivotally connected together at a second pivotal joint 30. The second and third links 24 and 26 are pivotally connected together at a third pivotal connection 32. The third link 26 is pivotally connected to the machine frame 12 at a fourth pivotal connection 34. Thus, the lifting linkage 20 in combination with the machine frame 12 forms a four-bar linkage.

The lifting linkage 20 includes two identical lifting linkages 20L and 20R on the left and right sides, respectively, of the machine frame 12. The third links 26 of each of the lifting linkages 20L and 20R are joined together by cross-bar 36 so that the two lifting linkages 20L and 20R move together. The lifting linkages 20L and 20R are sometimes referred to as lifting booms 20L and 20R and the lifting linkage 20 may be referred to as the boom 20 or the boom assembly 20.

Movement of the lifting linkages 20L and 20R relative to the machine frame 12 is controlled by left and right lifting actuators 38L and 38R. The lifting actuators may be hydraulic actuators, preferably hydraulic cylinders 38L and 38R. As is further discussed below one or both of the hydraulic cylinders 38L and 38R may be smart hydraulic cylinders having an integrated extension sensor 102C. A cylinder end of the hydraulic cylinder 38L is pivotally connected to the second link 24 at pivotal connection 42, and the piston end of the hydraulic cylinder 38L is pivotally connected to the machine frame 12 at pivotal connection 44.

In another embodiment the hydraulic actuator could be a hydraulic cylinder connected between two of the links such as first link 22 and second link 24.

In yet another embodiment the hydraulic lifting actuators could be hydraulic rotary actuators such as a slew drive connected to adjacent links at one of the common pivotal joints.

The third link 24 includes a longitudinally extending boom part 46 and a downwardly extending boom part 47. The bucket 18 is pivotally connected to the forward end of the downwardly extending boom part 47 at a hinge pin 48. The bucket actuator 40 is pivotally connected at one end at pivotal connection 49 to the downwardly extending boom part 47, and at the other end at pivotal connection 51 to the bucket 18.

Movement of the work implement or bucket 18 relative to the lifting linkage 20 is controlled by an implement actuator or bucket actuator 40 which preferably is a hydraulic cylinder type actuator. Although one bucket actuator 40 is shown, there may be multiple bucket actuators 40.

The lifting linkage 20 is shown in a lowermost position in FIG. 1A, an intermediate position in FIG. 1B and an uppermost position in FIG. 1C. The movement of the lifting linkage between the lowermost position of FIG. 1A and the uppermost position of FIG. 1C defines a range of motion of the lifting linkage 20. The lifting linkage 20 is moved from its lowermost position of FIG. 1A to its uppermost position of FIG. 1C by extension of the lifting actuators 38L and 38R.

Figure 2:
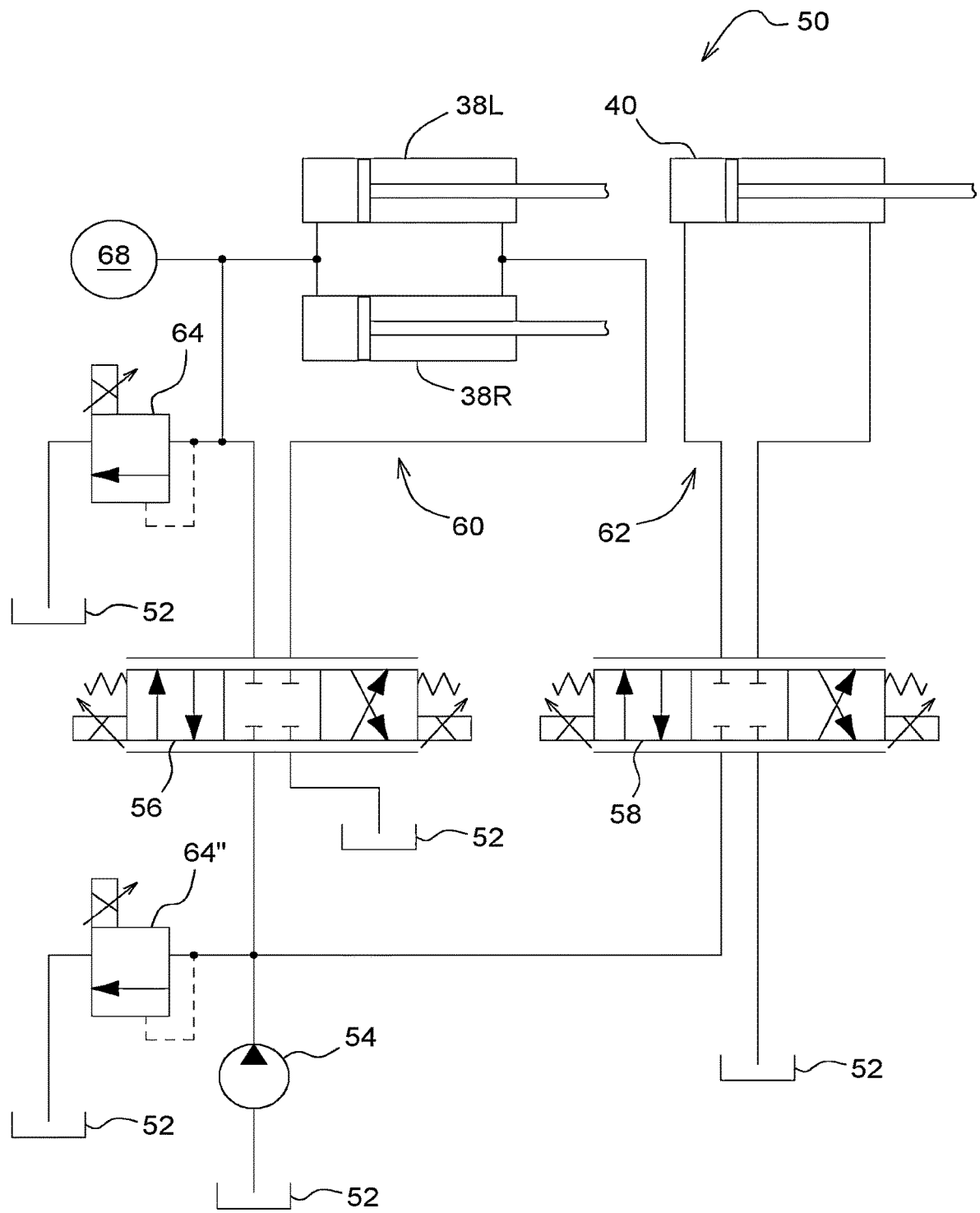
FIG. 2 is a schematic drawing of one embodiment of the hydraulic pressure supply system for the lifting actuators and the bucket actuator.

In FIG. 2 one embodiment of a hydraulic pressure supply system 50 for providing hydraulic pressure to the lifting actuators 38L and 38R, and the bucket actuator 40 is schematically shown. The hydraulic pressure supply system 50 includes a fluid reservoir 52, a pump 54, a first electrohydraulic control valve 56, a second electrohydraulic control valve 58, a first flow circuit 60, and a second flow circuit 62. The pump 54 directs fluid from the fluid reservoir 52 toward one or both of the first and second electrohydraulic control valves 56, 58.

The illustrated first electrohydraulic control valve 56 is a proportional control valve which can control a volume of fluid permitted to flow through the first valve 56. Therefore, in additional to fully open and fully closed, the first valve 56 has multiple intermediate positions that permit some fluid to flow through the first valve 56. The first valve 56 is fluidly positioned between the pump 54 and the first flow circuit 60. When the first valve 56 is either fully or partially open, the pump 54 moves fluid from the reservoir 52, through the first valve 56 into the first flow circuit 60. The illustrated first flow circuit includes two hydraulic cylinders 38L and 38R in parallel, but other quantities of hydraulic cylinders can be used. As discussed above, these hydraulic cylinders 38L and 38R are connected between the machine frame 12 and the left and right lifting booms 20L and 20R to move the lifting linkage 20 through its range of motion.

The illustrated second electrohydraulic control valve 58 is also a proportional control valve which can control a volume of fluid permitted to flow through the second valve 58. Therefore, in additional to fully open and fully closed, the second valve 58 has multiple intermediate positions that permit some fluid to flow through the second valve 58. The second valve 58 is fluidly positioned between the pump 54 and the second flow circuit 62. When the second valve 58 is either fully or partially open, the pump 54 moves fluid from the reservoir 52, through the second valve 58 into the second flow circuit 62 to pivot the bucket 18 relative to the lifting linkage 20.

As is further discussed below, the hydraulic pressure supply system 50 includes an adjustable pressure relief valve 64. The adjustable pressure relief valve 64 may be a solenoid operated adjustable pressure relief valve 64 having a relief pressure proportional to an input electrical current. The embodiment of the hydraulic pressure supply system 50 shown in FIG. 2 may use a pump 54 in the form of a gear pump 54, and the location shown for the adjustable pressure relief valve 64 provides pressure relief just to the two lifting actuators 38L and 38R. Alternatively, the adjustable pressure relief valve may be located directly adjacent the output of pump 54 in the location identified as 64", in which case the adjustable pressure relief valve 64" provides pressure relief also to the bucket actuator 40.

The system 50 may also include a pressure sensor 68 for sensing a load pressure in the lifting actuators 38L, 38R. As further discussed below the information from the pressure sensor 68 may be used as an additional basis for adjustment of the adjustable pressure relief valve 64.

Figure 8:
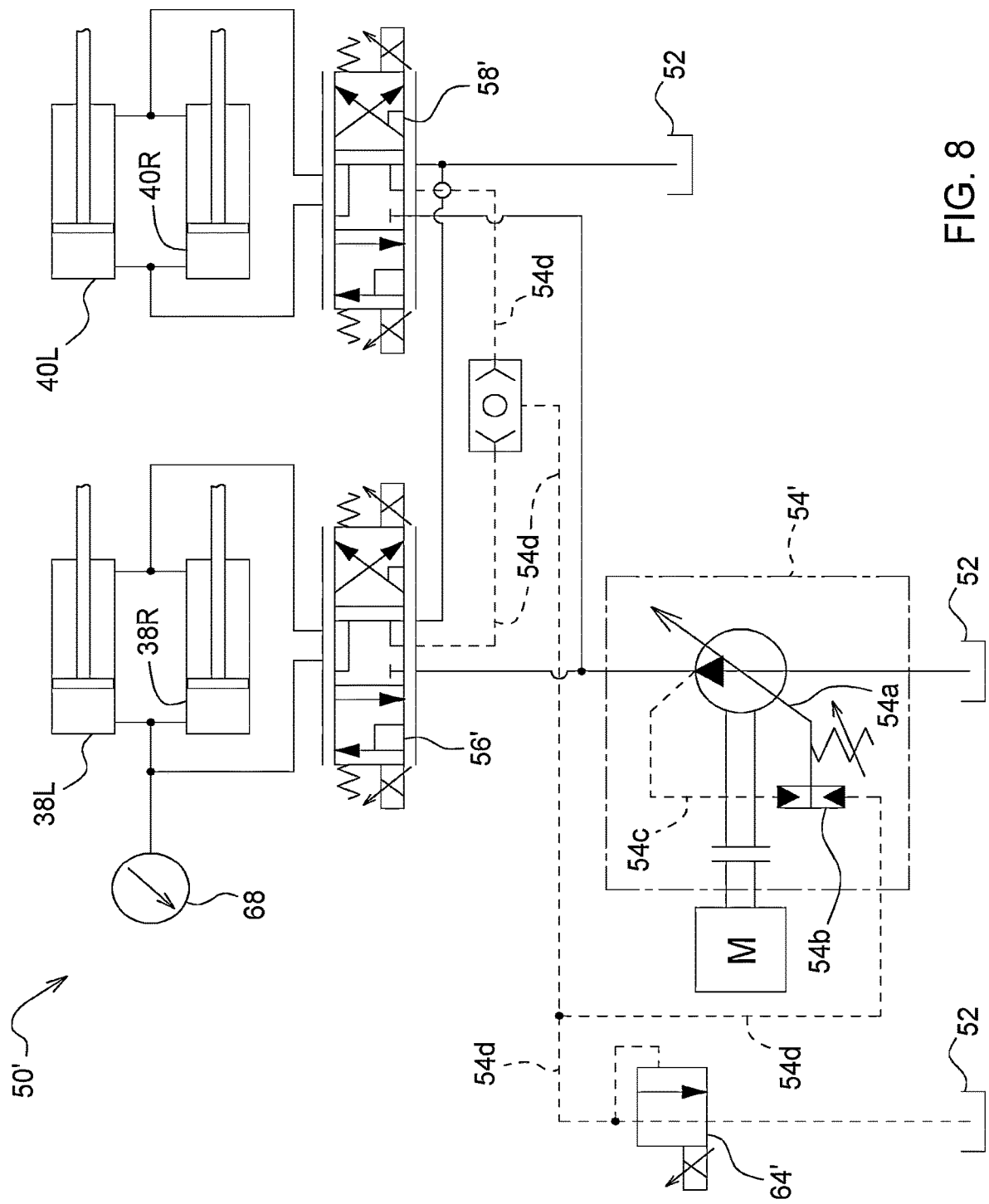
FIG. 8 is a schematic drawing of an alternative embodiment of the hydraulic pressure supply system for the lifting actuators and the bucket actuator, in this case using a load sensing hydraulic system.

An alternative embodiment of the hydraulic pressure supply system is shown in FIG. 8 and designated as 50'. The hydraulic pressure supply system 50' may be described as a load sensing hydraulic pressure supply system 50'. In the system 50' the pump may be provided in the form of an axial piston pump 54' which has multiple pistons the stroke of which is variable by the adjustment of a swash plate 54a. The swash plate 54a is adjusted by a hydraulic actuator 54b one end of which is exposed to pump outlet pressure via line 54c, and the other end of which is exposed to the maximum load pressure in the lifting cylinders 38L, 38R or the bucket cylinders 40L, 40R via load sensing line 54d. The two proportional control valves 56' and 58' function substantially similarly to the valves 56 and 58 of FIG. 2, with the addition of connections for the load sensing line 54d. The adjustable pressure relief valve 64' is connected to the load sensing line 54d. The system 50' may also include the pressure sensor 68 for sensing a load pressure in the lifting actuators 38L, 38R.

Stability Profiles

One issue which is important to the design and operation of the construction machine 10 is the stability of the machine when lifting heavy loads. Loader type construction machines such as a crawler loader, a skid steer loader, a backhoe loader or a four wheel drive loader are often rated for operating capacity at a specified percentage of "Tipping Load" or "Tip Load." For the machine 10 the "Tipping Load" is the load carried by bucket 18 which will cause the machine 10 to tip forward thus lifting the rear wheels 16 off of the ground 14. This tipping load is a function of the position of the lifting linkage within its range of motion because the load carried by the bucket 10 has a varying horizontal distance from a center of gravity of the machine 10 depending on the position of the lifting linkage 20 within its range of motion.

It will be appreciated that the machine 10 is not normally operated at lifting loads equal to its tipping load. Traditionally the "rated" operating capacity of such a machine is set at a given percentage of its tipping load, typically 35% of tipping load for tracked machines and 50% of tipping load for wheeled machines.

Figure 3A:
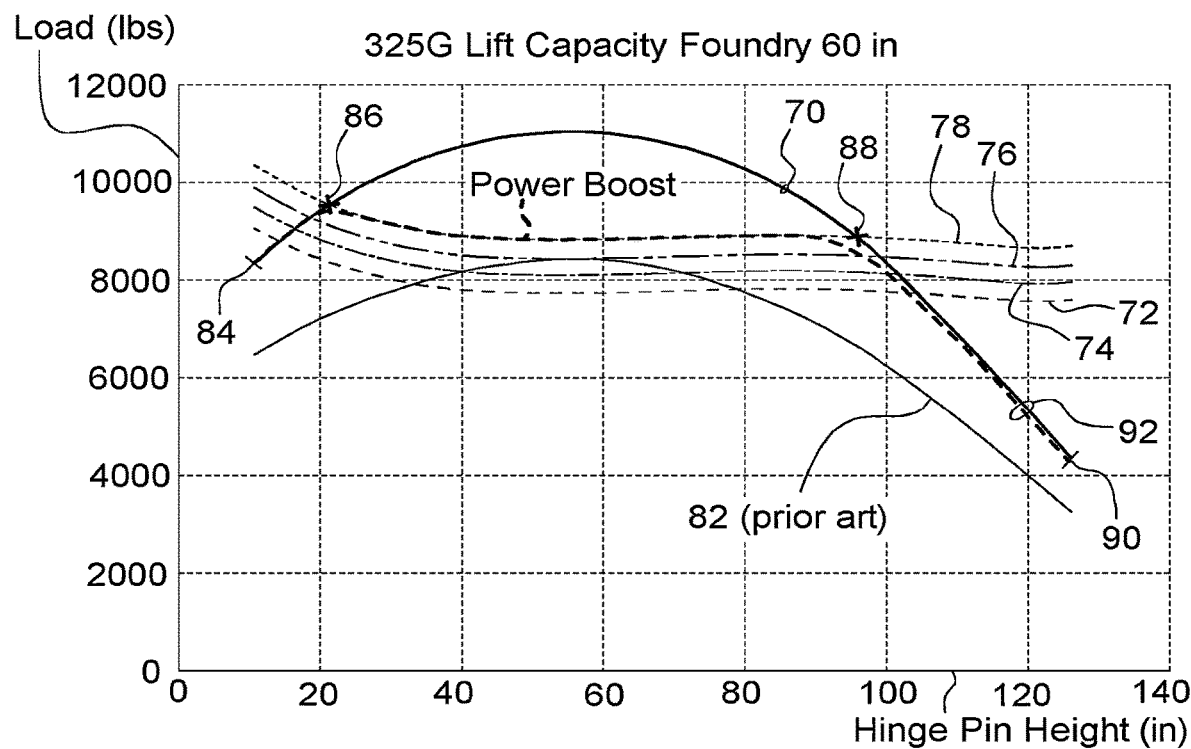
FIG. 3A is a graphical representation of the lift capacity of the construction machine, based on tip load, as a function of a position of the lifting linkage within its range of motion.

FIG. 3A diagrammatically illustrates several concepts related to the "Tipping Load" of a typical construction machine 10. The particular example of FIG. 3A was calculated for a John Deere Model 325G tracked loader. The horizontal axis on FIG. 3A represents the position of the lifting linkage 20 within its range of motion. This is described as a "Hinge Pin Height" stated in inches. The hinge pin height is the dimension 66 seen in FIGS. 1B and 1C, which is the height of the hinge pin 48 above the ground surface 14. The vertical axis of FIG. 3A represents the load in pounds carried by the bucket 18.

It will be appreciated that the maximum lifting force that can be applied to the lifting linkage 20 by the lifting actuators 38L and 38R is a function of: (1) the geometry of the lifting linkage 20; (2) the design and geometry of the lifting actuators 38L and 38R; and (3) the hydraulic pressure applied to the lifting actuators 38L and 38R. Thus, for a set design of the lifting linkage 20 and the lifting actuators 38L and 38R, the factor which can be controlled is the hydraulic pressure applied to the lifting actuators 38L and 38R. For a given design of the hydraulic pressure supply system, the maximum possible pressure that can be supplied is determined by the design of the pump 54 or 54'. The upper curve 70 of FIG. 3A represents the maximum possibly lifting capacity of the lifting linkage and lifting actuators of the modeled Model 325G machine at a static pressure of 4000 psi which is assumed to be the maximum output of the pump 54 in this example. This curve 70 shows a theoretical maximum lift capacity of about 11,000 lbs at a hinge pin height between 50 and 60 inches.

But as mentioned, the safe operating capacity of the machine 10 must also take into account the stability of the machine. FIG. 3A also shows four stability profile curves 72, 74, 76 and 78 representing the load at which the machine 10 will tip forward for various configurations of the machine 10 as a function of the hinge pin height. The four configurations depend on the number of counterweights 80 carried on each side of the machine frame 12. Curves 72, 74, 76 and 78 correspond to zero, one, two and three counterweights, respectively. Each of the curves 72, 74, 76 and 78 may be described as a stability profile representative of a tip load for the construction machine 10 as a function of the position of the lifting linkage 20 within the range of motion of the lifting linkage 20.

As is apparent in FIG. 3A, the maximum possible lifting capacity curve 70 is above the curves 72, 74, 76 and 78 throughout much of the range of motion of the lifting linkage 20 for hinge pin heights between about 20 inches and about 90 inches, so it is not permissible to operate the machine 10 at such loads or the machine 10 will tip forward as the hinge pin rises above the 20 inch height.

In a prior art version of the Deere 325G loader this problem was resolved by the use of a static pressure relief valve in the hydraulic supply circuit which had a fixed relief pressure value, resulting in a reduced lift capacity curve 82 which maintained the maximum possible lifting capacity below the stability profile of the machine. The disadvantage of the prior art solution is that a significant portion of the available lifting capacity of the pump 54 or 54' is not usable because of the limitation imposed by the static pressure relief valve.

The present invention addresses this problem by providing the hydraulic pressure supply system 50 or 50' with the adjustable pressure relief valve 64, 64' or 64". In one embodiment the adjustable pressure relief valve 64 may be a solenoid operated adjustable pressure relief valve having a relief pressure proportional to an electrical current input to the relief valve 64. The following description of the relief valve 64 is equally applicable to alternative valves 64' or 64". Using such an adjustable pressure relief valve 64, in combination with a suitably configured controller 120 further described below, the machine 10 can be configured to use the maximum possible lifting capacity that can be obtained from the pump 52 without exceeding the tipping load of the machine 10.

Figure 6:
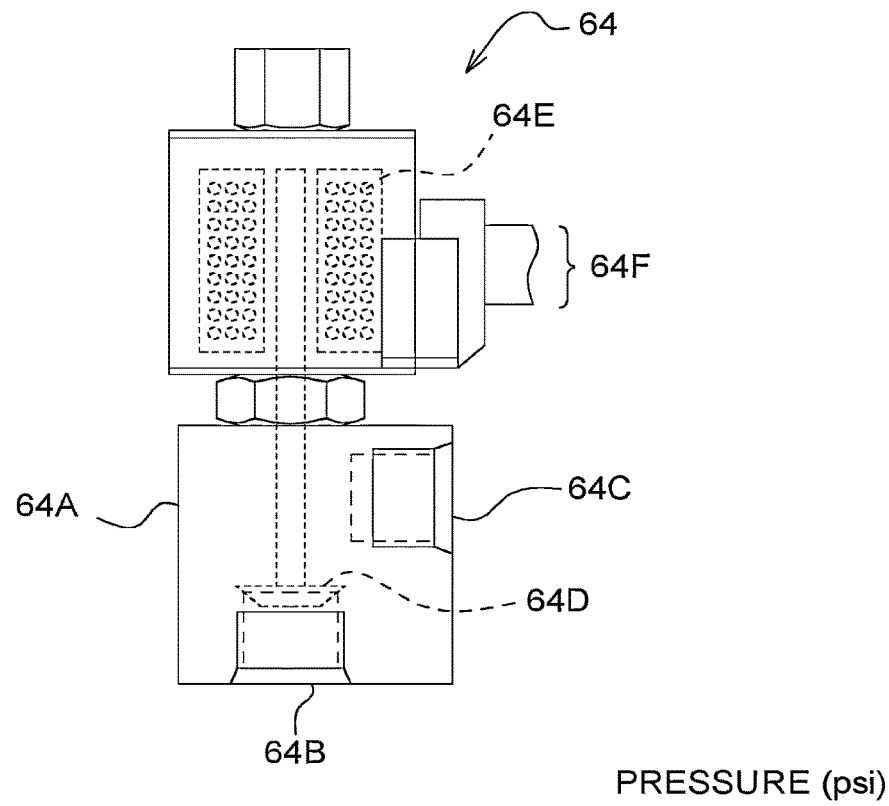
FIG. 6 is a schematic cross-section view of one example of the adjustable pressure relief valve.

One example of such an adjustable pressure relief valve 64 is schematically shown in FIG. 6. The valve 64 is a direct-acting, single stage, poppet-type, proportional pressure relieving valve. The regulated pressure is proportional to an input electrical current. The valve 64 includes a valve body 64A having first and second ports 64B and 64C. A poppet 64D blocks flow from port 64B to port 64C until sufficient pressure is present at port 64B to offset an electrically induced solenoid force applied to poppet 64D by solenoid 64E. A current is applied to solenoid 64E at contacts 64F as controlled by controller 120 as further described below.

Figure 7:
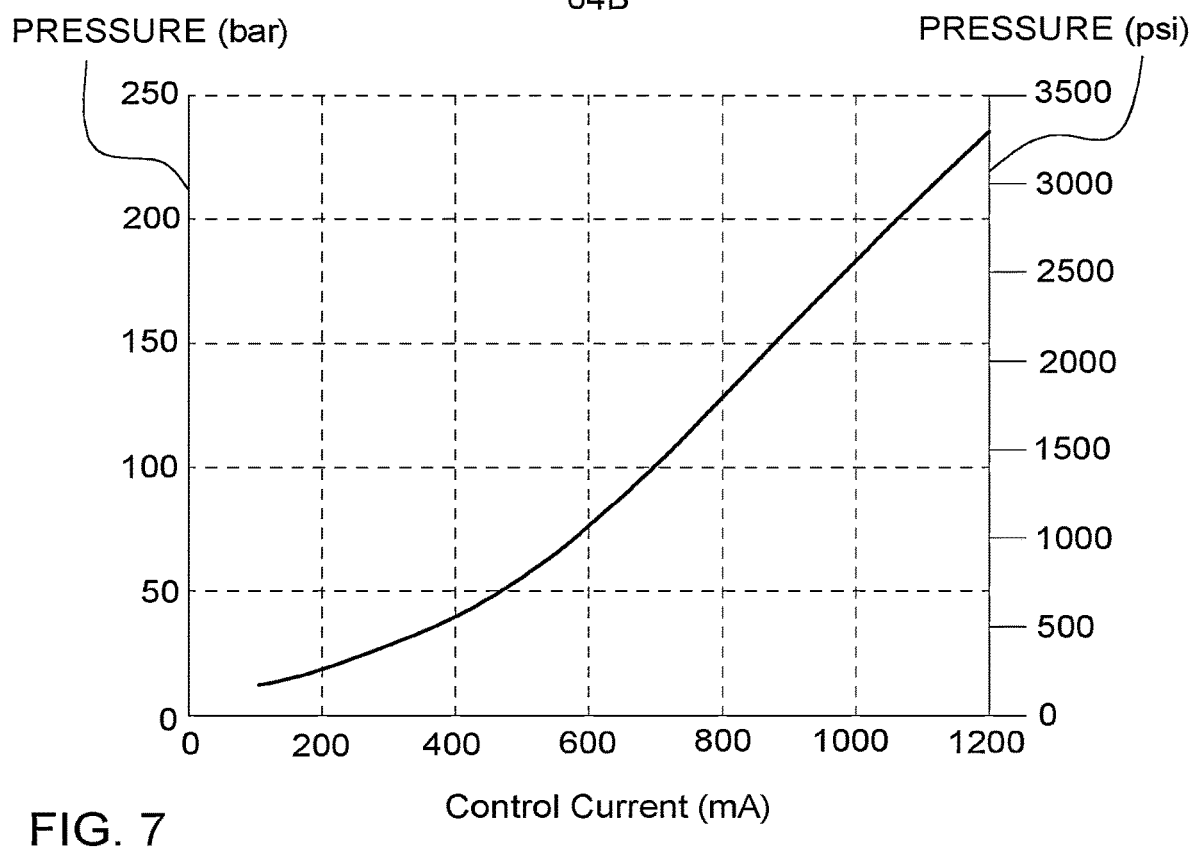
FIG. 7 is a schematic graphical representation of relief pressure v. control current for the valve of FIG. 6.

FIG. 7 schematically and graphically shows a typical relief pressure curve of the valve 64 as a function of the applied control current. The actual numbers shown in the example of FIG. 7 are not relevant, but the typical shape of the pressure v. control current curve is representative. The valve 64 may be selected from available valves based on the pressures desired for the construction machine 10. Such adjustable pressure relief valves are available for example from the Hydraforce company as can be seen at hydraforce.com.

For example, assuming that the machine 10 is configured with three counterweights 80 on each side of the machine frame 12, the stability profile of the machine 10 is represented by the curve 78. So, the maximum usable capacity of the pump 52 is obtained as we move upward through the range of motion, by first following the curve 70 from the lowermost position represented by point 84, up to a hinge pin height of about 20 inches where curve 70 crosses above curve 78 as represented by point 86. Then curve 78 is followed until a height of a little over 90 inches where the curve 70 again drops below curve 78 as represented by point 88. The curve 70 must be followed up to the maximum hinge pin height of a bit over 120 inches as represented by point 90. This combined curve from point 84, to point 86, to point 88, to point 90, is labeled as the "Power Boost" curve 92 which is shown as a thicker line.

By controlling the pressure relief valve 64 to vary the system relief pressure of the hydraulic pressure supply system 50 so that the lifting linkage 20 can lift a maximum load up to, but not exceeding, the power boost curve 92, the lifting capacity of the machine 10 is increased as compared to that of the prior art maximum lifting capacity curve 82. The increase in lifting capacity is represented as the area between the curves 82 and 92. This may be described as varying the system relief pressure of the hydraulic pressure supply system 50 such that a maximum load liftable by the lifting linkage 20 at a given position of the lifting linkage within the range of motion corresponds to the tip load for the construction machine 10 at the given position of the lifting linkage 20 within the range of motion. That tip load is represented by the stability profile curve 78. When the maximum load liftable by the lifting linkage 20 at a given position of the lifting linkage within the range of motion "corresponds to" the tip load for the construction machine 10 at the given position of the lifting linkage 20 within the range of motion, this does not necessarily mean that the maximum load liftable is equal to the tip load; it only means that the tip load is used as a factor in adjusting the pressure relief valve 64 to limit the maximum load liftable by the lifting linkage.

Figure 3B:
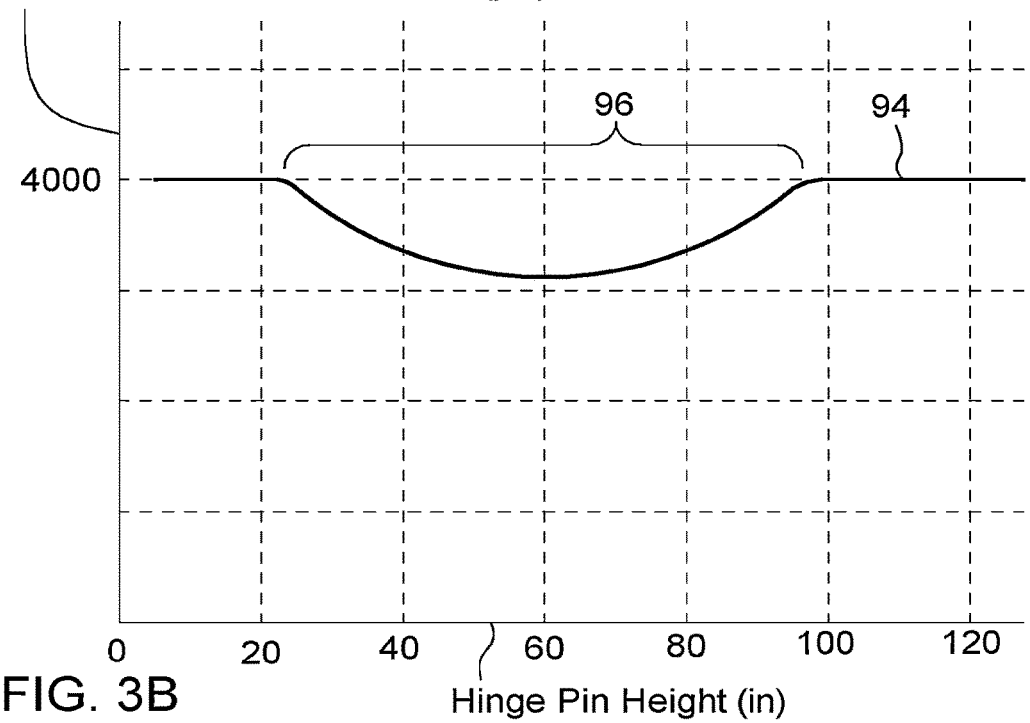
FIG. 3B is a graphical representation of the required pressure input to the lifting actuators to lift a load equal to the tip load as a function of the position of the lifting linkage within the range of motion.

It will be appreciated that for any selected load at any given position of the lifting linkage 20 along the power boost curve 92 there will be a specific pressure required to be applied to the lifting actuators 38L and 38R to achieve the maximum permissible lifted load defined by the power boost curve 92. FIG. 3B schematically and graphically represents this required pressure as a function of the hinge pin height. In this example those portions of the power boost curve 92 which coincide with the curve 70 require the full 4000 psi available from the pump 52, and for those portions of the power boost curve 92 between points 86 and 88 the pressure must be reduced so that the lifting linkage 20 is not allowed to lift an excessive load which would lead to tipping of the machine 10. This pressure curve is identified in FIG. 3B as 94. It is noted that the reduced pressure portion 96 of curve 94 is shown schematically only and the quantitative values of the indicated pressure are not scalable in FIG. 3B.

Sensing Linkage Position

In order to control the relief pressure of the adjustable pressure relief valve 64 as described above it is necessary to know the position of the lifting linkage 20 within its range of motion. This can be accomplished with any one of several forms of a position sensor 102 operably associated with the lifting linkage 20 for generating a position signal representative of the position of the lifting linkage 20 within its range of motion.

One embodiment of position sensor may take the form of at least one rotary position sensor 102A configured to measure a relative rotation between two adjacent links of the four bar linkage formed by the lifting linkage 20 at any one of the pivotal joints 26, 28, 30 or 34. For example as schematically shown in FIG. 1C, the rotary position sensor 102A may be located at the first pivotal joint 28 between the first link 22 and the machine frame 12.

A second embodiment of a position sensor 102 may take the form of at least one inertial measurement unit 102B mounted on at least one of the movable links 22, 24 or 26. In FIG. 1C such an IMU 102B is schematically shown as carried by the first movable link 22.

A third embodiment of a position sensor 102 may take the form of an extension sensor 102C integrally formed in one or both of the hydraulic lifting actuators 38L and 38R when those actuators are embodied as "smart" hydraulic cylinders.

Figure 4:
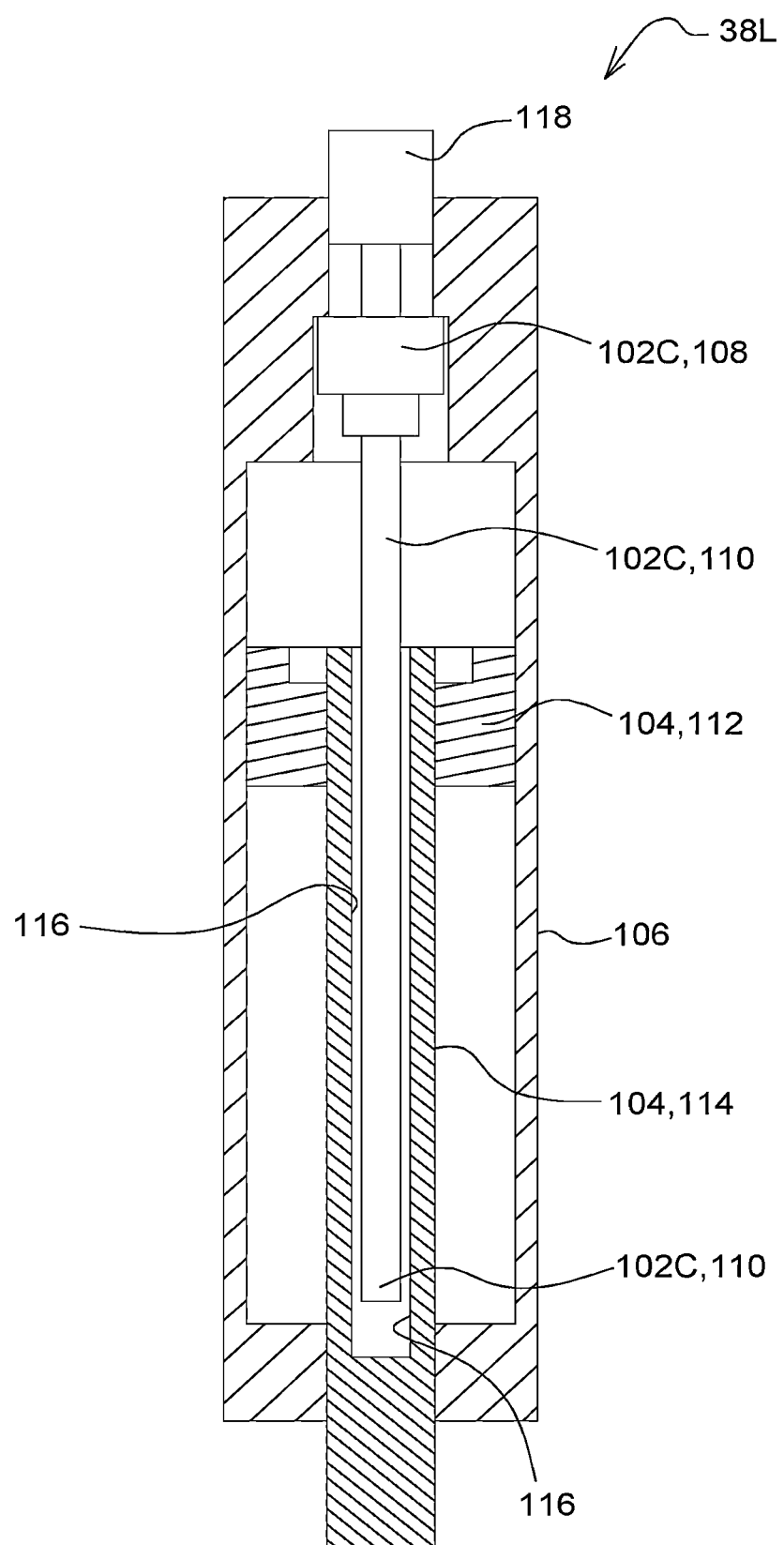
FIG. 4 is a schematic diagram of the lifting actuator in the form of a smart hydraulic cylinder having an integrated extension sensor.

A representative construction of such a "smart" hydraulic cylinder is shown in FIG. 4. In the illustrated embodiment, the actuator 38L includes an integrated sensor 102C configured to provide a signal corresponding to an extension of a piston portion 104 relative to a cylinder member 106 of the actuator 38L.

The sensor 102C includes a position sensor electronics housing 108 and a position sensor coil element 110. The piston portion 104 of actuator 38L includes a piston 112 and a rod 114. The piston 112 and rod 114 have a bore 116 defined therein, within which is received the position sensor coil element 110.

The actuator 38L is constructed such that a signal is provided at connector 118 representative of the position of the piston 112 relative to the position sensor coil element 110.

Such smart cylinders may operate on several different physical principles. Examples of such smart cylinders include but are not limited to magneto-strictive sensing, magneto-resistive sensing, resistive (potentiometric) sensing, Hall effect sensing, sensing using linear variable differential transformers, and sensing using linear variable inductance transducers.

The Controller

Figure 5:
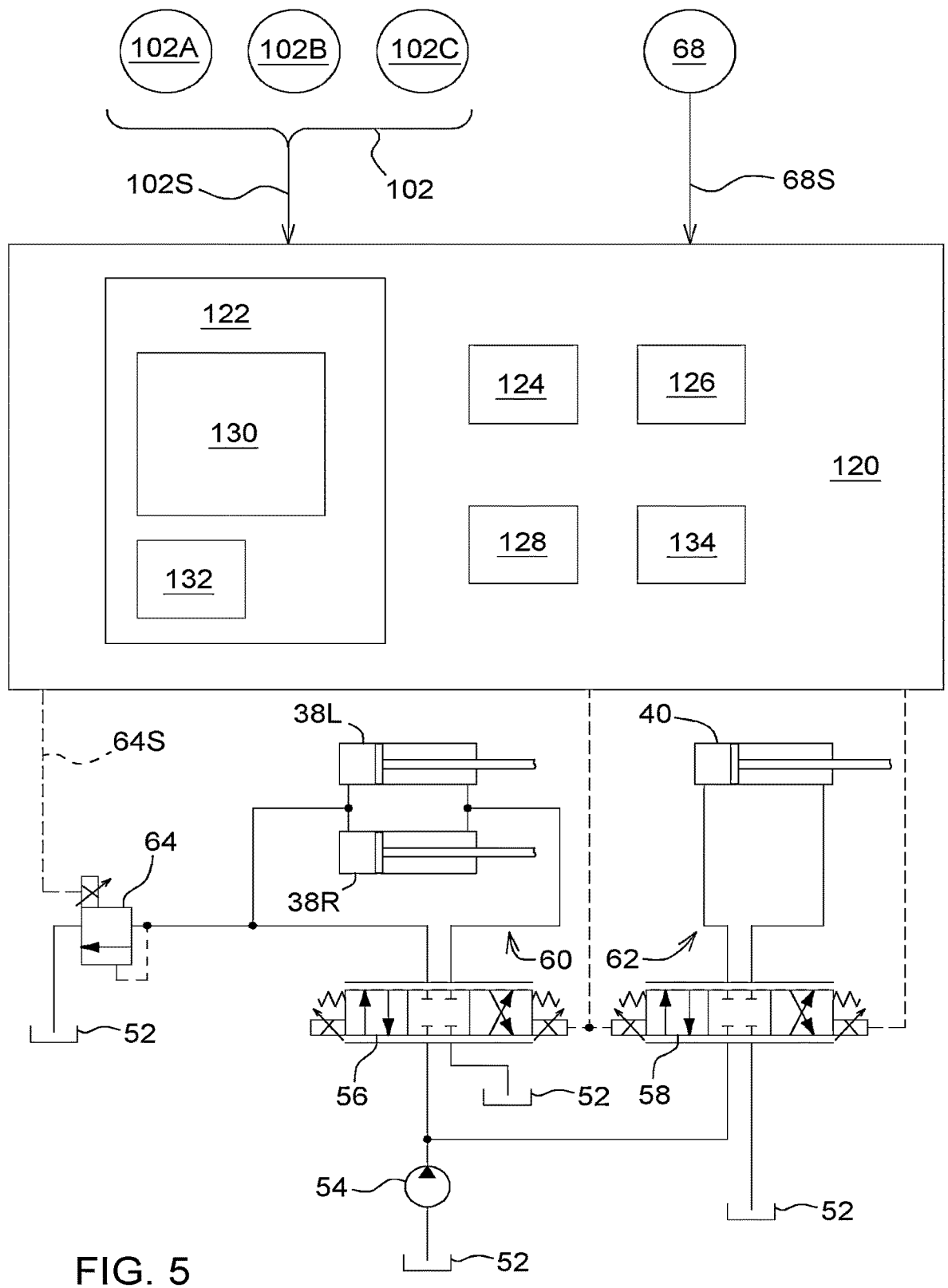
FIG. 5 is a schematic diagram of a control system for the construction machine.

As schematically illustrated in FIG. 5, the construction machine 10 includes a control system 100 including a controller 120. The controller 120 may be part of the machine control system of the construction machine 10, or it may be a separate control module. The controller 120 may for example be mounted in a control panel 122 located at the operator's station 15. The controller 120 is configured to receive input signals from the various sensors. The signals transmitted from the various sensors to the controller 120 are schematically indicated in FIG. 5 by lines connecting the sensors to the controller with an arrowhead indicating the flow of the signal from the sensor to the controller 120.

For example, position signals 102S from the position sensors such as 102A, 102B and 102C will be received so that the controller 120 can monitor the position of the lifting linkage 20 within its range of motion. The controller 120 may also receive a load pressure signal 68S from pressure sensor 68.

Similarly, the controller 120 will generate control signals for controlling the operation of the various actuators discussed above, which control signals are indicated schematically in FIG. 5 by dashed lines connecting the controller 120 to graphic depictions of the various actuators with the arrow indicating the flow of the command signal from the controller 120 to the respective actuators. It will be understood that for control of a hydraulic cylinder type actuator the controller 120 will send an electrical signal to an electro/mechanical control valve such as the valves 56 and 58 which control flow of hydraulic fluid to and from the respective hydraulic cylinder.

FIG. 5 schematically shows the left lifting actuator 38L, the right lifting actuator 38R and the bucket actuator 40 corresponding to the hydraulic pressure supply system 50 of FIG. 2. The control system shown in FIG. 5 is equally applicable to control of the hydraulic pressure supply system 50' of FIG. 8. It will be understood that the controller 120 may control other actuators or components of construction machine 10, including for example hydraulic drive motors (not shown) for the wheels 16.

Controller 120 includes or may be associated with a processor 124, a computer readable medium 126, a data base 128 and an input/output module or control panel 122 having a display 130. An input/output device 132, such as a keyboard, joystick or other user interface, is provided so that the human operator may input instructions to the controller. It is understood that the controller 120 described herein may be a single controller having all of the described functionality, or it may include multiple controllers wherein the described functionality is distributed among the multiple controllers.

Various operations, steps or algorithms as described in connection with the controller 120 can be embodied directly in hardware, in a computer program product 134 such as a software module executed by the processor 124, or in a combination of the two. The computer program product 134 can reside in RAM memory, flash memory, ROM memory, EPROM memory, EEPROM memory, registers, hard disk, a removable disk, or any other form of computer-readable medium 126 known in the art. An exemplary computer-readable medium 126 can be coupled to the processor 124 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

Particularly the controller 120 may be programmed to receive a position signal 102S from one of the position sensors 102A, 102B or 102C, and to send a control signal 64S to vary the system relief pressure of the hydraulic pressure supply system 50 at least in part in response to the position signal. More particularly, the controller 120 may be configured to generate the control signal as an electrical current signal 64S sent to the solenoid operated adjustable pressure relief valve 64.

When the adjustable pressure relief valve 64 is set up it will be calibrated according to a relief pressure versus control current curve like that of FIG. 7. That is the information that the controller 120 will use to determine the control signal to be sent to the adjustable pressure relief valve. It will be appreciated that the calibration of the adjustable pressure relief valve may not be completely accurate; that is the relief pressure corresponding to a given control current value may not be precisely as predicted. To improve the precision of control, the controller 120 may also use other information in addition to the position signal 102S as a basis for controlling the adjustable pressure relief valve 64. For example, if the hydraulic pressure supply system 50 or 50' is provided with the pressure sensor 68, the controller may compare that actual lifting pressure in the lifting actuators 38L, 38R to the desired maximum load pressure for the linkage position and provide further adjustment to the adjustable pressure relief valve 64 accordingly. Thus the controller 120 may be configured to receive the pressure signal 68S from the pressure sensor 68 and to generate the control signal 64S to vary the system relief pressure of the hydraulic pressure supply system 50 at least in part in response to the pressure signal 68S.

In one embodiment the controller 120 may be programmed such that the stability profiles such as 72, 74, 76, 78 are stored in the computer readable medium 126. Those stability profiles being representative of the tip load for the construction machine 10 as a function of the position of the lifting linkage 20 within the range of motion. And the controller 120 may be configured to vary the system relief pressure of the hydraulic pressure supply system 50 such that a maximum load liftable by the lifting linkage 20 at a given position of the lifting linkage 20 within the range of motion corresponds to the tip load for the construction machine 10 at the given position of the lifting linkage within the range of motion.

One manner in which this can be accomplished is for the controller 120 to have stored in the computer readable medium 126 the desired relationship of system relief pressure as a function of the position of the lifting linkage 20 within its range of motion, as shown for example in FIG. 3B. The controller 120 so configured may determine a required pressure input to the hydraulic actuators 38L and 38R to lift a load equal to the tip load at the given position of the lifting linkage within the range of motion by reference to the information of FIG. 3B, and then may send the control signal 64S to the adjustable pressure relief valve 64 to adjust the system relief pressure to equal the required pressure input.

Industrial Applicability

By implementing a proportionally controlled system pressure relief as described above the maximum amount of lift can be achieved within the stability limit of the machine 10. The relief pressure may be varied though the full range of motion of the lifting linkage 20 to provide the best possible machine stability for the operator. Utilizing the position sensor 102, the proportional relief valve 64, and the controller 120 configured as described, the relief pressure can be varied to provide the highest available lift capacity at a specific boom height for any specific lifting linkage 20 and specific configuration of the associated construction machine 10. The construction machine 10 will not be limited in capacity as the prior art machines were due to a static system relief pressure.

When the construction machine 10 is initially set up at a dealership it is typically configured with the desired number of counterweights 80 and the controller 120 is configured to utilize the appropriate stability curve 72, 74, 76 or 78 as represented in FIG. 3A, and the appropriate corresponding pressure curve 94 as represented in FIG. 3B. If the machine 10 is later reconfigured, whether at the dealer or by the user, the controller may be reconfigured to again select the appropriate stability curve 72, 74, 76 or 78 as represented in FIG. 3A, and the appropriate corresponding pressure curve as represented in FIG. 3B. The controller 120 may also be configured to allow the operator to select an appropriate stability curve 72, 74, 76 or 78 as represented in FIG. 3A, and the appropriate corresponding pressure curve 94 as represented in FIG. 3B, based on a reconfiguration of the machine 10 by the operator. Such selection may be accomplished via the input/output device 132.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A construction machine, comprising:
a machine frame;
a plurality of ground engaging wheels or tracks supporting the machine frame;
a work implement;
a lifting linkage connected to the work implement for lifting and lowering the work implement relative to the machine frame, the lifting linkage being movable through a range of motion from a lowermost position to an uppermost position;
a position sensor operably associated with the lifting linkage for generating a position signal representative of a position of the lifting linkage within the range of motion;
a hydraulic actuator connected to the lifting linkage for moving the lifting linkage through the range of motion;
a hydraulic pressure supply system for providing hydraulic pressure to the hydraulic actuator;
a controller configured to receive the position signal and to generate a control signal to vary a system relief pressure of the hydraulic pressure supply system at least in part in response to the position signal;
wherein the construction machine has a stability profile representative of a tip load for the construction machine as a function of the position of the lifting linkage within the range of motion; and
wherein the controller is configured to vary the system relief pressure of the hydraulic pressure supply system such that a maximum load liftable by the lifting linkage at a given position of the lifting linkage within the range of motion corresponds to the tip load for the construction machine at the given position of the lifting linkage within the range of motion.

2. The construction machine of claim 1, wherein:
the lifting linkage is a kinematic linkage including a plurality of links connected together at a plurality of pivotal joints.

3. The construction machine of claim 2, wherein:
the position sensor includes at least one rotary position sensor configured to measure a relative rotation between two adjacent links at one of the pivotal joints.

4. The construction machine of claim 2, wherein:
the position sensor includes at least one inertial measurement unit mounted on at least one of the links.

5. The construction machine of claim 2, wherein:
the hydraulic actuator is a hydraulic cylinder.

6. The construction machine of claim 5, wherein:
the hydraulic cylinder is a smart hydraulic cylinder and the position sensor is an extension sensor integral to the smart hydraulic cylinder.

7. The construction machine of claim 1, wherein the controller is further configured to:
determine a required pressure input to the hydraulic actuator to lift a load equal to the tip load at the given position of the lifting linkage within the range of motion; and
adjust the system relief pressure to equal the required pressure input.

8. The construction machine of claim 1, wherein:
the hydraulic pressure supply system includes a solenoid operated adjustable pressure relief valve having a relief pressure proportional to an input electrical current; and
the controller is configured to generate the control signal as an electrical current signal sent to the solenoid operated adjustable pressure relief valve.

9. The construction machine of claim 1, wherein:
the construction machine is one of a crawler loader, a skid steer loader, a backhoe loader or a four wheel drive loader.

10. The construction machine of claim 1, further comprising:
a pressure sensor configured to detect a working pressure of the hydraulic actuator; and
wherein the controller is configured to receive a pressure signal from the pressure sensor and to generate the control signal to vary the system relief pressure of the hydraulic pressure supply system at least in part in response to the pressure signal.

11. A method of operating a construction machine, the construction machine including a machine frame, a plurality of ground engaging wheels or tracks supporting the machine frame, a work implement, a lifting linkage connected to the work implement and movable through a range of motion from a lowermost position to an uppermost position, a hydraulic actuator for moving the lifting linkage, and a hydraulic pressure supply system for providing hydraulic pressure to the hydraulic actuator, the method comprising:
sensing a position of the lifting linkage within the range of motion and generating a position signal corresponding to the sensed position;
receiving the position signal with a controller and generating a control signal to vary a system relief pressure of the hydraulic pressure supply system at least in part in response to the position signal; and
wherein the system relief pressure is varied such that a maximum load liftable by the lifting linkage at a given position of the lifting linkage within the range of motion corresponds to a tip load for the construction machine at the given position of the lifting linkage within the range of motion.

12. The method of claim 11, wherein:
the generating of the control signal includes determining a required pressure input to the hydraulic actuator to lift a load equal to the tip load at the given position of the lifting linkage within the range of motion; and
in response to the control signal the system relief pressure is adjusted to equal the required pressure input.

13. The method of claim 11, wherein:
the hydraulic pressure supply system includes a solenoid operated adjustable pressure relief valve having a relief pressure proportional to an input electrical current; and
the control signal is the input electrical current for the solenoid operated adjustable pressure relief valve.

14. The method of claim 11, wherein:
the hydraulic pressure supply system includes a pressure sensor configured to detect a working pressure of the hydraulic actuator; and
the controller receives a pressure signal from the pressure sensor and generates the control signal to vary the system relief pressure of the hydraulic pressure supply system at least in part in response to the pressure signal.

* * * * *